(12) United States Patent
Gibbs (10) Patent No.: US 11,766,908 B2
(45) Date of Patent: *Sep. 26, 2023

(54) RETRACTABLE WHEEL ASSEMBLY FOR AN AMPHIBIAN

(71) Applicant: Gibbs Technologies Limited, Nuneaton (GB)

(72) Inventor: Alan Timothy Gibbs, London (GB)

(73) Assignee: Gibbs Technologies Limited, Warwickshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/936,010

(22) Filed: Jul. 22, 2020

(65) Prior Publication Data

US 2020/0353783 A1 Nov. 12, 2020

Related U.S. Application Data

(63) Continuation of application No. 15/572,068, filed as application No. PCT/GB2016/051323 on May 9, 2016.

(30) Foreign Application Priority Data

May 7, 2015 (GB) .................................. 1507845

(51) Int. Cl.
*B60F 3/00* (2006.01)
*B60G 3/14* (2006.01)
*B60G 3/18* (2006.01)

(52) U.S. Cl.
CPC ............... *B60F 3/003* (2013.01); *B60G 3/14* (2013.01); *B60G 3/18* (2013.01); *B60F 2301/04* (2013.01);

(Continued)

(58) Field of Classification Search
CPC ........ B60F 2301/04; B60F 3/003; B60F 3/00; B60G 2300/128; B60G 2204/47;

(Continued)

(56) References Cited

U.S. PATENT DOCUMENTS 3,755,838 A 9/1973 Dunagan
5,531,179 A 7/1996 Roycroft
(Continued)

FOREIGN PATENT DOCUMENTS

CN 2458184 Y 11/2001
CN 1478030 A 2/2004
(Continued)

OTHER PUBLICATIONS

European Patent Office, International Search Report, dated Jul. 5, 2016.

*Primary Examiner* — Drew J Brown
(74) *Attorney, Agent, or Firm* — Price Heneveld LLP (57) ABSTRACT

A retractable wheel and/or track drive assembly for an amphibian comprising an actuator, a retraction linkage assembly movable between a protracted position and a retracted position, a suspension assembly at least partially connected to the retraction linkage assembly and movable between a protracted position and a retracted position, and at least one wheel and/or track drive, wherein when the retraction linkage assembly and the suspension assembly are protracted then the retraction linkage and/or suspension assembly supports and/or holds at least one wheel and/or track drive in a ground engaging position for use on land.

16 Claims, 13 Drawing Sheets

(52) U.S. Cl.
CPC .... *B60G 2204/127* (2013.01); *B60G 2204/47* (2013.01); *B60G 2300/28* (2013.01)

(58) Field of Classification Search
CPC ...... B60G 3/18; B60G 3/14; B60G 2204/127; B60G 2300/28
See application file for complete search history.

(56) References Cited

U.S. PATENT DOCUMENTS

| | | | |
|---|---|---|---|
| 5,755,173 | A | 5/1998 | Rorabaugh et al. |
| 6,945,832 | B2 | 9/2005 | Roycroft |
| 7,234,982 | B2 | 6/2007 | Longdill |
| 7,371,137 | B2 | 5/2008 | Rees |
| 2003/0176119 | A1 | 9/2003 | Royle |
| 2006/0178058 | A1* | 8/2006 | Longdill ............... B60F 3/0007 440/12.52 |
| 2008/0268728 | A1 | 10/2008 | Wilson |
| 2010/0136858 | A1 | 6/2010 | King |
| 2011/0189906 | A1 | 8/2011 | Gibbs |
| 2011/0189908 | A1 | 8/2011 | Gibbs |
| 2011/0275256 | A1 | 11/2011 | Gibbs |
| 2013/0203304 | A1 | 8/2013 | Jenkins |
| 2014/0127956 | A1 | 5/2014 | Gibbs |
| 2018/0178893 | A1 | 6/2018 | Gibbs |

FOREIGN PATENT DOCUMENTS

| | | |
|---|---|---|
| CN | 101065254 A | 10/2007 |
| CN | 101389498 A | 3/2009 |
| CN | 203019994 U | 6/2013 |
| CN | 203496 | 3/2014 |
| CN | 203496594 A | 3/2014 |
| GB | 2134052 | 8/1984 |
| GB | 2404171 A | 1/2005 |
| GB | 2491845 | 12/2012 |
| WO | 0216152 | 2/2002 |
| WO | 2011077090 A | 6/2011 |

\* cited by examiner

RETRACTABLE WHEEL ASSEMBLY FOR AN AMPHIBIAN

CROSS-REFERENCE TO RELATED PATENT APPLICATIONS

The present application is a continuation of U.S. patent application Ser. No. 15/572,068, filed Nov. 6, 2017, entitled "A RETRACTABLE WHEEL ASSEMBLY FOR AN AMPHIBIAN," now U.S. Pat. No. 10,967,691, which claims benefit to PCT Application No. PCT/GB2016/051323, filed May 9, 2016, entitled "A RETRACTABLE WHEEL ASSEMBLY FOR AN AMPHIBIAN," the entire disclosures of which are incorporated herein.

BACKGROUND OF THE INVENTION

The present invention relates to a retractable wheel assembly particularly suitable for use in an amphibian capable of travel on land and water. More particularly, the retractable wheel assembly is suitable for use in a high speed amphibian which is capable of planing on water and high speed travel on land (on or off-road, in two or four wheel drive). Whilst a wheel is referred to, track drives or individual track drives (i.e. to replace a single wheel) may be used as an alternative or in combination with wheels. The present invention also relates to an amphibian comprising such a retractable wheel assembly.

Retractable wheel assemblies for use in amphibians are known in the art. These retractable wheel assemblies are typically used to lift wheels to reduce drag when operating the amphibian on water. Many of these known wheel retraction systems are complicated and/or provide poor suspension when the vehicle is used on land. For example, US5755173 describes the use for each wheel of a transversely-extending single arm which swings upwardly around a longitudinal axis of the vehicle. This results in compromised suspension on land, as there is too much camber change on bump and on rebound. WO02/16152 describes a trailing arm suspension. This gives zero camber change to the wheel when one side of the car loads up during cornering. This provides for poor road holding when on land. U.S. Pat. No. 3,755,838 also describes a trailing arm suspension. This again provides poor road holding on land.

More recently, however, the applicant has developed retractable wheel assemblies for use in a new class of high speed amphibians having at least one retractable wheel and which are capable of planing on water. The retractable wheel assemblies include retractable suspension assemblies and provide for improved suspension and thus road handling when the amphibian is operated on land.

The remains, however, a need to improve on these prior art retractable wheel assemblies by providing for increased wheel retraction in marine mode, yet improve upon the ground clearance in land mode to provide more flexibility and utility in terms of the off-road capability for use of a high speed amphibian on land. The need to retract and protract wheel assemblies reliably in a manner that can deal with extremes of normal and shock loading with off-road use, particularly in a large and/or heavily loaded amphibian, presents significant problems in terms of suspension performance, ground clearance, packaging, weight distribution and also in terms of how the resulting power transmission pathways and steering can be realised and effected.

SUMMARY OF THE INVENTION

The present invention provides a retractable wheel assembly which addresses these conflicting requirements, and does so without compromising suspension performance, ground clearance, packaging, weight distribution and is still able to realise the power transmission pathways and steering functions necessary.

Accordingly, in a first aspect, the present invention provides a retractable wheel and/or track drive assembly for an amphibian comprising:

an actuator;

a retraction linkage assembly movable between a protracted position and a retracted position;

a suspension assembly at least partially connected to the retraction linkage assembly and movable between a protracted position and a retracted position; and at least one wheel and/or track drive, wherein:

when the retraction linkage assembly and the suspension assembly are protracted then the retraction linkage and/or suspension assembly supports and/or holds the at least one wheel and/or track drive in a ground engaging position for use on land; and at least one component of the retraction linkage assembly is arranged so as to be spaced from the suspension assembly.

In a further aspect, the present invention provides an amphibian comprising one or more of the retractable wheel and/or track drive assemblies.

In a further aspect, the present invention provides a retractable wheel and/or track drive assembly for an amphibian substantially as set forth and described herein with reference to or as shown in the accompanying drawings.

In a further aspect, the present invention provides an amphibian comprising one or more of the retractable wheel and/or track drive assemblies substantially as set forth and described herein with reference to or as shown in the accompanying drawings.

BRIEF DESCRIPTION OF THE DRAWINGS

Preferred embodiments of the present invention will now be described by way of example only with reference to the accompanying drawings, in which.

DETAILED DESCRIPTION

Referring to the Figures, there is shown a retractable wheel assembly 10 for use in an amphibian. The retractable wheel assembly 10 can be used for a steerable wheel 100, as shown in the FIGS. 1 to 6 and 10a to 10i embodiment for front wheels, or for a non-steerable wheel, as shown in the FIGS. 7 to 9 and 11a to 11i embodiment for rear wheels. Further, the retractable wheel assembly 10 can be used for a driven wheel or non-driven wheel, and is shown in the Figures in the context of driven (or selectively driveable) wheels. The amphibian (not shown) includes a prime mover (not shown) for providing power where required to drive one or more of the wheels (or track drive(s)) supported on each retractable wheel assembly 10 on land. The prime mover may also provide power to drive a marine propulsion unit for propelling the amphibian on water. The wheel 100 is rotatably connected to a suspension upright 20 (sometimes termed a hub carrier or, when steerable, a knuckle) via a wheel hub 50. A suspension assembly is provided by way of a suspension upright 20, suspension control arms 30, 40 and a spring damper suspension strut 60. The suspension strut 60 may take any suitable alternative form, such as a hydropneumatic strut, a gas spring strut or an air spring strut, for example. The suspension upright 20 has a first upper end 24 pivotably connected to the outboard end of an upper control arm 40 via a pivot P8, and a second lower end 22 distal from the first upper end 24 and provided with the wheel hub 50 for receiving a wheel. Between the first upper end 24 and the second lower end 22, the suspension upright 20 is pivotably connected to the outboard end of a lower control arm 30 via a pivot P9. As shown in the FIGS. 1 to 6 and 10a to 10i embodiment for the front wheels, the suspension upright 20 is steerable (a knuckle) about the upper and lower control arms 40, 30, and this connection is realised by way of oversized ball joints which serve as pivots P8, P9 therebetween which have been machined to a "waisted" shape to provide the necessary degree of articulation required both for steering and retraction. As shown in the FIGS. 7 to 9 and 11a to 11i embodiment for the rear wheels, the suspension upright 20 is not steerable, and the pivot P8, P9 connection with the upper and lower control arms 40, 30 is realised by way of a combination of polyurethane bushes and radial spherical plain bearings which provide the necessary degree of articulation required for retraction. The upper and lower control arms 40, 30 can take any suitable form, and for example may preferably take the form of wishbone shaped arms (bifurcated) with the apex of each arm connected to the suspension upright 20 via the respective pivots P8, P9. The inboard ends of the bifurcated upper control arm 40 are pivotably connected to the amphibian (not shown) via pivots FP7, FP17, and the inboard ends of the lower control arms 30 are pivotably connected to the amphibian (not shown) via a pivots FP3, FP13. Pivots FP3, FP7, FP13, FP17 comprise polyurethane bushes. The upper control arm 40 is shorter than the lower control arm 30. Pivots FP7, FP17 and FP3, FP13 are fixedly located in position on the amphibian, save for rotation about their pivot axis (i.e. are free to pivot, but not free to undergo any translational movement). A retraction linkage is provided and comprises a top mounting 90, a central mounting 92, a hydraulic actuator 70, a retraction arm 80, a lever 82 and a cranked (angled) lever 84, the retraction linkage being used to effect controlled retraction and protraction of the suspension assembly of the retractable wheel assembly 10. The non actuating end 72 of the hydraulic actuator 70 is pivotably connected to the amphibian (not shown) via a fixed pivot FP2 of the top mounting 90, while the actuating rod end 74 of the hydraulic actuator 70 is pivotably connected with the respective second ends of the lever 82 and the cranked lever 84 via a pivot P4 (or spaced therefrom in the rear embodiment). Fixed pivot FP2 is fixedly located in position on the amphibian, save for rotation about its pivot axis. A first end of lever 82 is fixedly located in position on the amphibian via a fixed pivot FP1 of the central mounting 92, save for rotation about its pivot axis, while the second end of lever 82 is capable of translation and of rotation about the pivot axis of pivot P4. Similarly, the second end of cranked lever 84 is capable of translation and of rotation about the pivot axis of pivot P4. A first end of cranked lever 84 is connected to a lower end of the retraction arm 80 via a pivot P5 and is capable of translation and of rotation about the pivot axis of pivot P5. An upper end of retraction arm 80 is pivotably connected to the amphibian (not shown) via a fixed pivot FP2 of the top mounting 90 (or spaced therefrom in the rear embodiment), while the lower end of retraction arm 80 is additionally pivotably connected with the upper end of the spring damper suspension strut 60 via a pivot P6. The spring damper suspension strut 60 comprises a lower end connected to the lower control arm 30 via a pivot P10. The upper and lower control arms 40, 30, the suspension upright 20 and the spring damper suspension strut 60 may, if preferred, together form a double wishbone suspension unit. Of course, double wishbone suspension units are well known in road only going vehicles and provide good levels of road holding ability. The ride handling characteristics of this layout are well known, and so can be adapted or tuned to the specific requirements of the amphibian, in order to provide a comfortable ride and/or good cornering capabilities, and/or good off road capability.

The retraction linkage arrangement enables the retractable wheel assembly 10 to rigidly support the suspension assembly in a protracted position to allow the suspension assembly to function when the amphibian is operated on land. The retraction linkage assembly of the retractable wheel assembly 10 is further operable to retract the suspension assembly along with the wheel when the amphibian is operated on water, such that the wheel can retract by at least 75 degrees, but more preferably by at least 90 degrees.

All of the pivots FP1, FP2, FP3, P4, P5, P6, FP7, P8, P9, P10, FP13 and FP17 allow for relative rotational movement of the attached members, generally in substantially the same plane or parallel planes. Further, the pivots FP1, FP2, FP3, P4, P5, P6, FP7, P8, P9, P10, FP13 and FP17 rotate about axes each generally or substantially parallel to a longitudinal axis of the amphibian at least. This arrangement provides for wheel retraction about a longitudinal axis of the amphibian, and for steering of the suspension upright 20 (knuckle) for the front wheels.

A wheel 100, when attached to the wheel hub 50, is therefore secured to the amphibian via the retractable wheel assembly 10 at multiple points FP1, FP2, FP3, FP13, FP7, FP13, FP17, at least some of which are spaced with respect to another along the longitudinal axis of the amphibian. The resulting wheel retraction assembly is therefore configured to withstand the forces experienced by the wheel even in off-road conditions when operated on land.

Operation of the retractable wheel assembly 10 will now be described.

When the amphibian is operated in a land mode (including entry into and egress from the water), the wheel retraction assembly 10 is in a fully protracted position as shown in FIGS. 1, 3, 10a to 10c (front) and 11a to 11c (rear), in which the wheel 100 is in contact with a road or other ground surface. The hydraulic actuator 70 is extended and may be locked in position, hydraulically or mechanically or both, so that the wheel retraction assembly 10 remains in an 'overcentre' position. Indeed, in the protracted position shown in FIG. 3, there are two overcentre positions realised, a "primary lock out" overcentre OCP and a "secondary lock out" overcentre OCS. The primary lock out overcentre OCP is illustrated by respective centre lines C1 and C2 of the retraction arm 80 and the spring damper suspension strut 60, these centre lines C1 and C2 being angled at 9 degrees to one another in the primary lock out overcentre OCP position. The secondary lock out overcentre OCS is illustrated by respective centre lines C3 and C4 of the lever 82 and cranked lever 84, these centre lines C3 and C4 being angled at 3 degrees to one another in the secondary lock out overcentre OCS position. A bar or other such member (not shown) may be provided to act as a mechanical end stop to limit the travel of the primary and/or secondary overcentre actions. In the overcentre position, loads experienced by and transferred from the wheel 100 mounted on the wheel hub 50 are transmitted via the suspension upright 20 through pivot P9 and on through the lower control arm 30 via pivot P10 to the lower end of the spring damper suspension strut 60. The spring damper suspension strut 60 is constrained at its upper end by pivot P6 located in the primary lock out overcentre OCP position, thereby resisting axial movement by virtue of the mechanical lock provided by the retract arm 80 which is held in place by fixed pivot FP2 and the remaining components of the retraction linkage assembly (including, optionally, hydraulically locked hydraulic actuator 70 achieved by shutting of inlet/outlet valves 76, 78 to prevent hydraulic fluid flow in a known manner, but any suitable form of lock may be employed (e.g. mechanical, electromechanical, pin, magnetic, etc.)). The primary and secondary lock out overcentre OCP, OCS positions do not require, on a relative basis, a large force to be maintained if such a force is applied in a direction urging the arrangement more overcentre or preventing it moving less overcentre. Therefore, a spring-loaded gate feature, detent, pin, magnetic or electro-magnetic lock or other similar device can be employed in place of, or in addition to, a hydraulic or other positive locking mechanism. The hydraulic actuator 70 can easily overcome this force when the retractable wheel assembly 10 is either protracted into, or retracted from, its land engaging position. However, in the event the actuator cannot function to maintain this force (e.g. if hydraulic pressure were lost), the detent mechanism (or other equivalent feature(s) employed) can maintain sufficient force to allow continued operation on land. The non actuating end 72 of the hydraulic actuator 70 is fixed in position (but pivotable) by virtue of its connection to the amphibian (not shown) via pivot FP2, while the actuating rod end 74 of the hydraulic actuator 70 is pivotably connected (and can move in terms of axial extension and retraction) to the secondary overcentre position OCS of lever 82 and cranked lever 84 via pivot P4. As such, all bump and rebound is transmitted to and attenuated by the spring damper suspension strut 60. The received forces act along the longitudinal axis of the spring damper suspension strut 60, which at its upper end is biased towards and on the overcentre side, acting to urge the retractable wheel assembly further overcentre and not in a direction which seeks to force a retraction of the wheel retraction assembly. As the amphibian is driven, the suspension assembly acts in a known manner. In bump travel, the wheel retraction assembly 10 remains locked in place in an overcentre condition OCP and OCP, providing fixed inboard pivot points FP3, FP13, FP7, FP17 for the double wishbone suspension unit. The wheel 100 will be urged upwardly by the bump in the road or ground surface. Upper control arm 40 and lower control arms 30 will rotate upwardly about fixed inboard pivot points FP3, FP13, FP7, FP17. Upper control arm 40 is shorter than lower control arms 30, so that the upward movement of the wheel results in a small camber change of the wheel towards an inboard side of the amphibian, and this aids road/ground holding. The spring damper suspension strut 60 is partially compressed during part bump travel, and resists the upward movement of the wheel to keep the wheel 100 in contact with the road/ground.

It will be appreciated, therefore, that during bump travel the retractable action of the retractable wheel assembly 10 is locked stationary, and the function of the suspension assembly is not compromised or affected by the ability of the retractable wheel assembly 10 to retract the wheel 100 in marine mode.

Referring next to FIGS. 10a to 11i in particular, the retraction of a front and a rear wheel (not shown) will be described. The components shown in FIGS. 10a to 11i are identical to, and arranged in the same manner as, those shown in FIGS. 1 to 9, and so reference numerals have been omitted to aid clarity. The retraction is actuated by contraction of the hydraulic actuator 70 along the arrow R indicated in FIGS. 10b and 11b by supplying pressurised hydraulic fluid to inlet/outlet port 78 and allowing hydraulic fluid to escape from inlet/outlet port 76. Since the hydraulic actuator 70 is securely attached to the amphibian by the fixed pivot FP2, the retraction urges pivot P4 generally towards fixed pivot FP2. The pivot P4 provided on the respective second ends of the lever 82 and cranked lever 84 is therefore rotated upwardly as can be seen in FIGS. 10e and 11e. Lever arm 82 thus rotates clockwise around its fixed pivot FP1 fixedly located in position on the amphibian. Cranked lever arm 84 thus rotates counter-clockwise around its pivot P6 with the retract arm 80, as does retract arm 80 which is in turn pivotally connected to the upper end of the spring damper suspension strut 60 via the pivot P6 and to the fixed pivot FP2 fixedly located in position on the amphibian. The upper end of the spring damper suspension strut 60 is pulled laterally inboard around an arc as indicated by the arrow I in FIGS. 10e and 11e, passing through the primary overcentre position OCP, before continuing inboard and downwards, pulling via the lower end of the spring damper suspension strut 60 connected to the lower control arm 30 via the pivot P10. Lower control arm 30 is rotated clockwise around fixed pivot points FP3, FP13, and in turn, via the pivot P9, lifts suspension upright 20 whose motion is dictated also by the upper pivot P8 at the outboard end of upper control arm 40. Upper control arm 40 rotates clockwise around fixed pivot FP7, FP17 in an arc as indicated by the arrow U in FIGS. 10e and 11e. The clockwise rotation of the upper control arm 40 and lower control arm 30 carries the suspension upright 20 and wheel upwardly. Initially, the movement of the wheel is substantially as if it is rotated around pivot P9. Note, prior to retraction (in droop mode in the water), the spring damper suspension strut 60 tends to expand as the weight of the amphibian is taken off the wheel. The expansion of the spring damper suspension strut 60 is limited by a rebound stop (not shown) and reaches a maximum. The longer length of the lower control arm 30 relative to the upper control arm 40, coupled with the relatively long length of the suspension upright 20, provides for long vertical travel of the retractable wheel assembly on retraction, allowing the wheel to be retracted above the waterline of the amphibian, even when a deep V-hull is employed and is cornering. The amphibian is able to plane on water without drag caused by the wheel. FIGS. 10g to 10i (front) and 11g to 11i (rear) correspond and show the retractable wheel assembly in the fully retracted position for use of the amphibian on water.

For protraction of the wheel, the protraction process is actuated by extension of the hydraulic actuator 70 by supplying pressurised hydraulic fluid to inlet/outlet port 76 and allowing hydraulic fluid to escape from inlet/outlet port 78. The retraction process described above is essentially operated in reverse, and finishes with the upper end of the spring damper suspension strut 60 being pushed laterally outboard around an arc, opposite to that indicated by the arrow I in FIGS. 10e and 11e, and passing through a centre to the primary overcentre position OCP where the wheel retraction assembly is locked as described above.

The retractable wheel assembly provides substantial lifting capability. It may, therefore, in certain circumstances (e.g. if the amphibian is beached or runs aground) be possible for the wheels to be protracted to lift the amphibian upwards. Since the rotational axis of the wheels is close to parallel to the ground during the final stages of deployment, the amount of tyre scrub in such a deployment is kept low.

Figure 1:
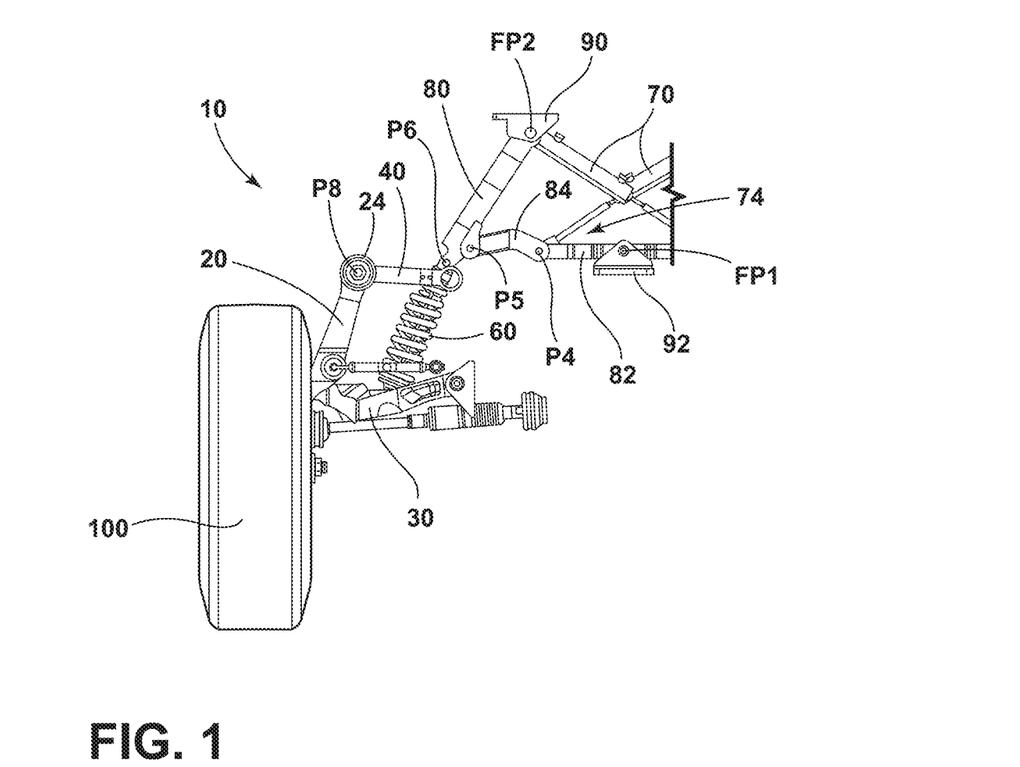
FIG. 1 is a schematic rear elevation view of a port front retractable wheel assembly according to the present invention in a protracted position (certain components omitted for clarity)
Figure 2:
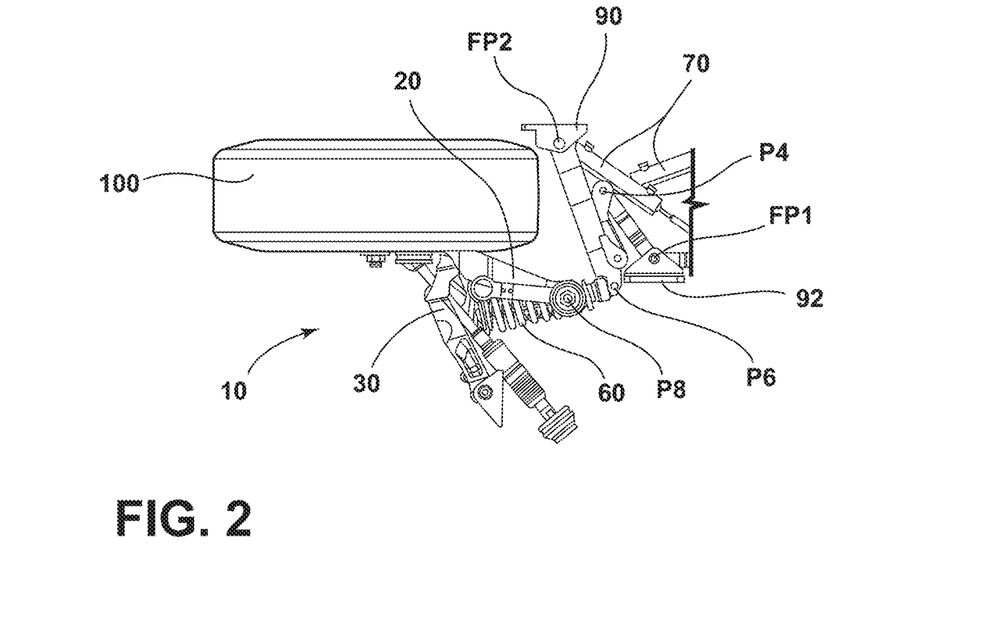
FIG. 2 is a schematic front elevation view of the retractable wheel assembly of FIG. 1 in a retracted position (certain components omitted for clarity)
Figure 3:
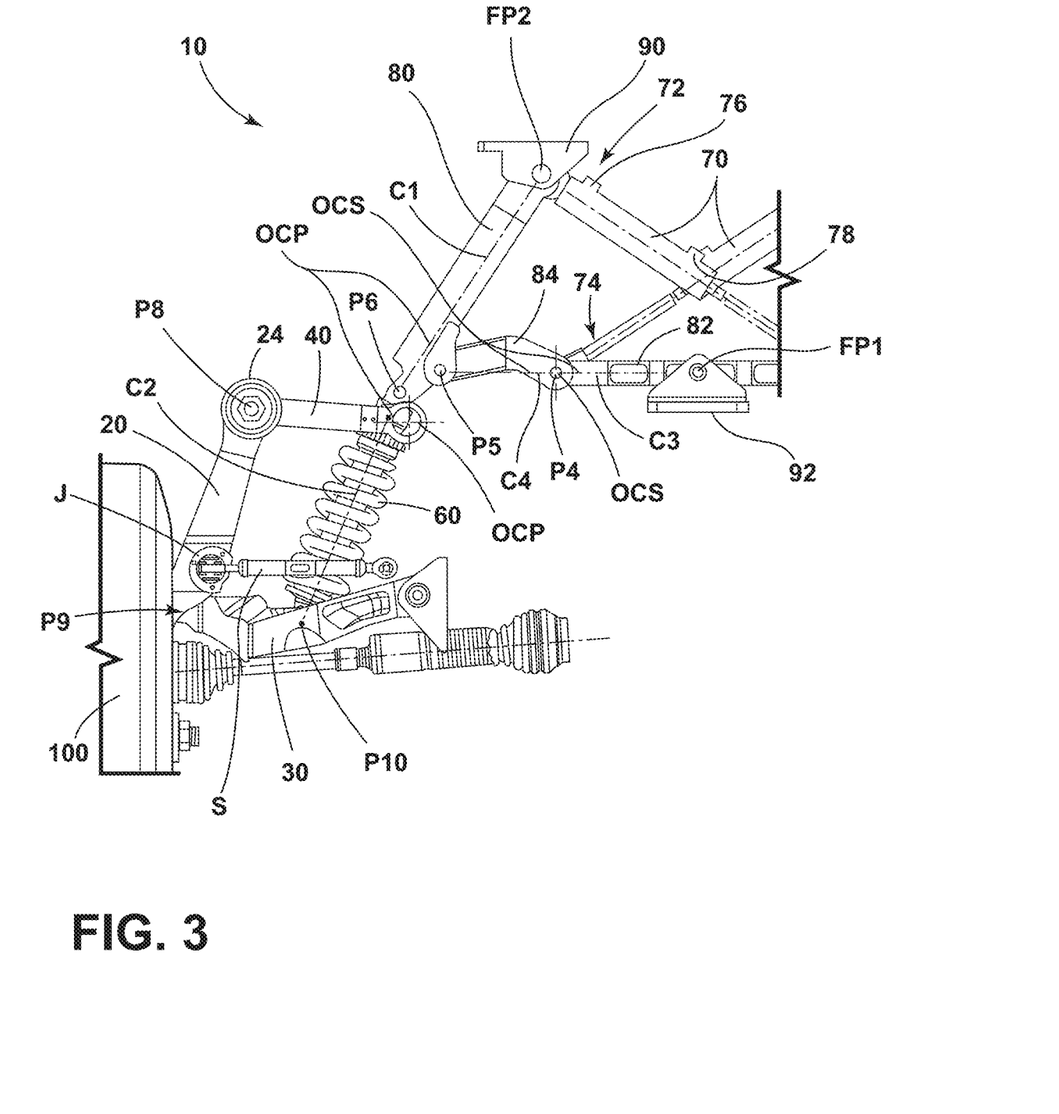
FIG. 3 is an enlarged detail view of the retractable wheel assembly of FIG. 1 (certain components omitted for clarity)
Figure 4:
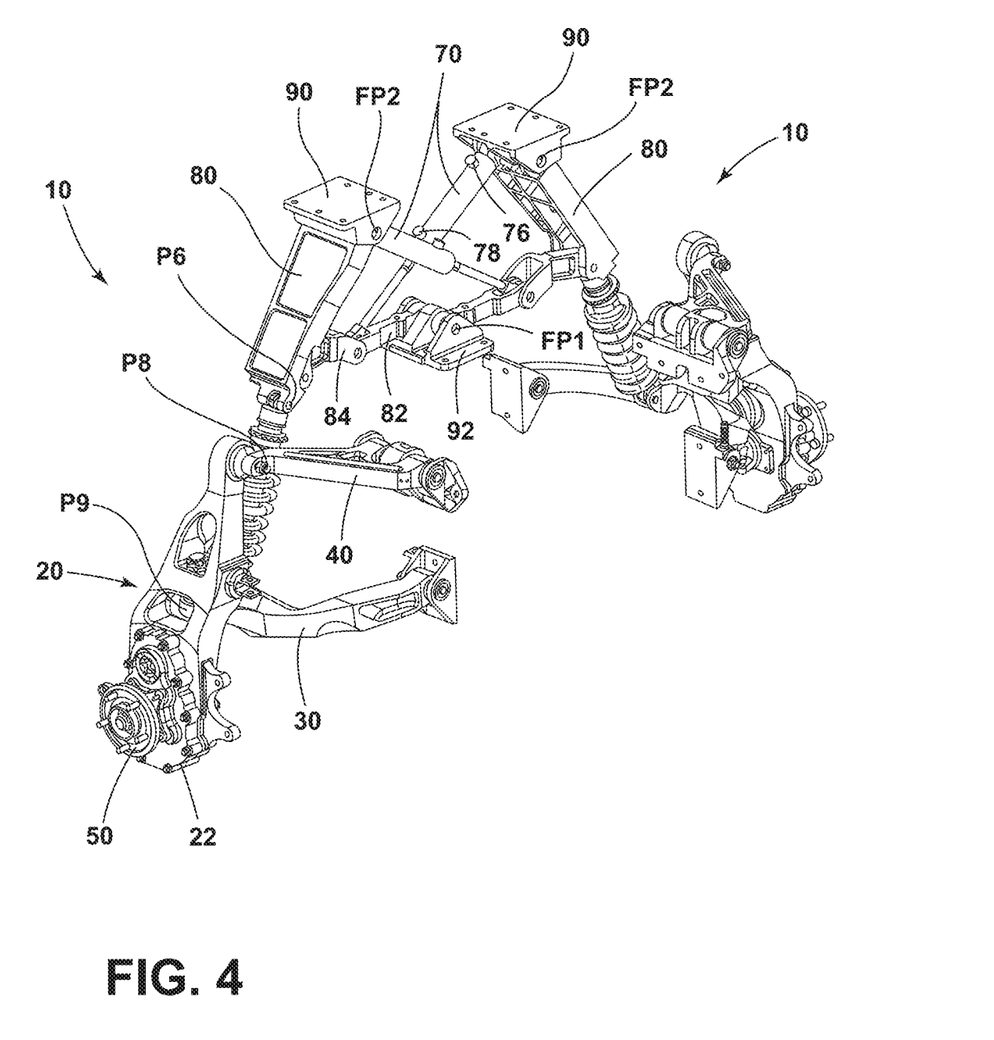
FIG. 4 is a schematic rear perspective view of port and starboard front retractable wheel assemblies in a protracted position (certain components omitted for clarity)
Figure 5:
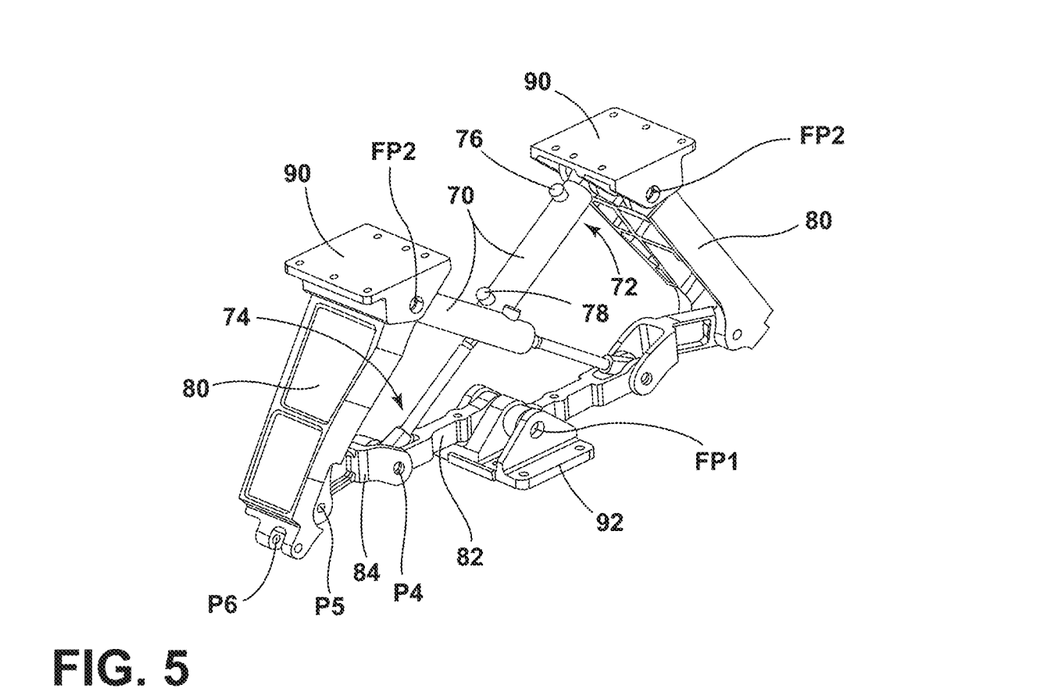
FIG. 5 is an enlarged detail view of a retraction linkage of the port and starboard front retractable wheel assemblies of FIG. 4 (certain components omitted for clarity)
Figure 6:
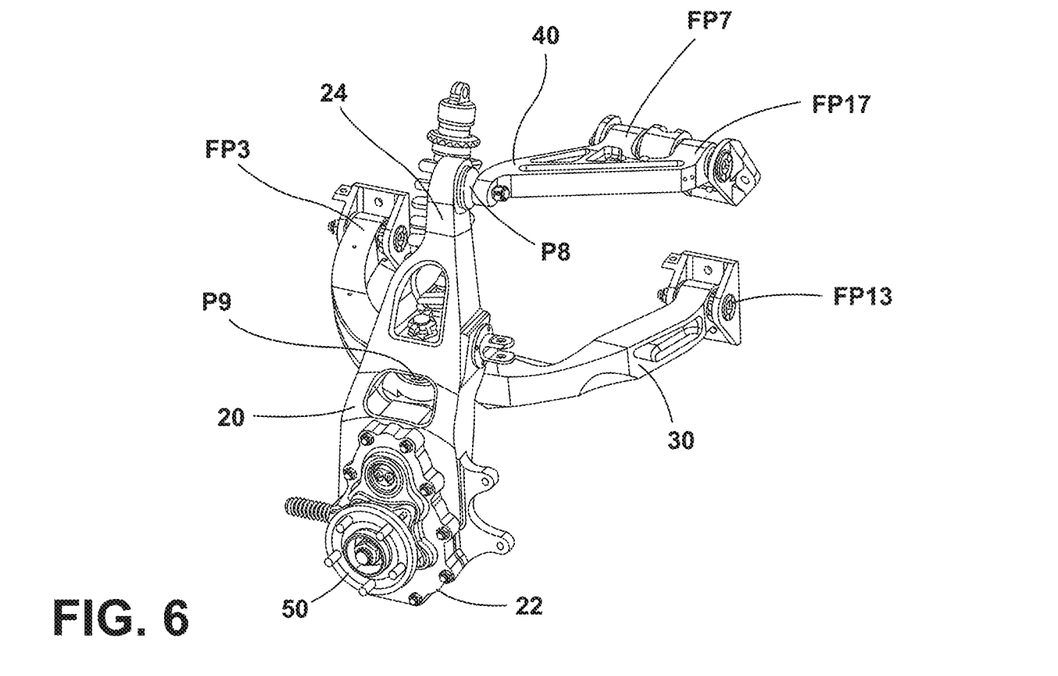
FIG. 6 is an enlarged detail view of a suspension assembly of the port front retractable wheel assembly of FIG. 4 (certain components omitted for clarity)
Figure 7:
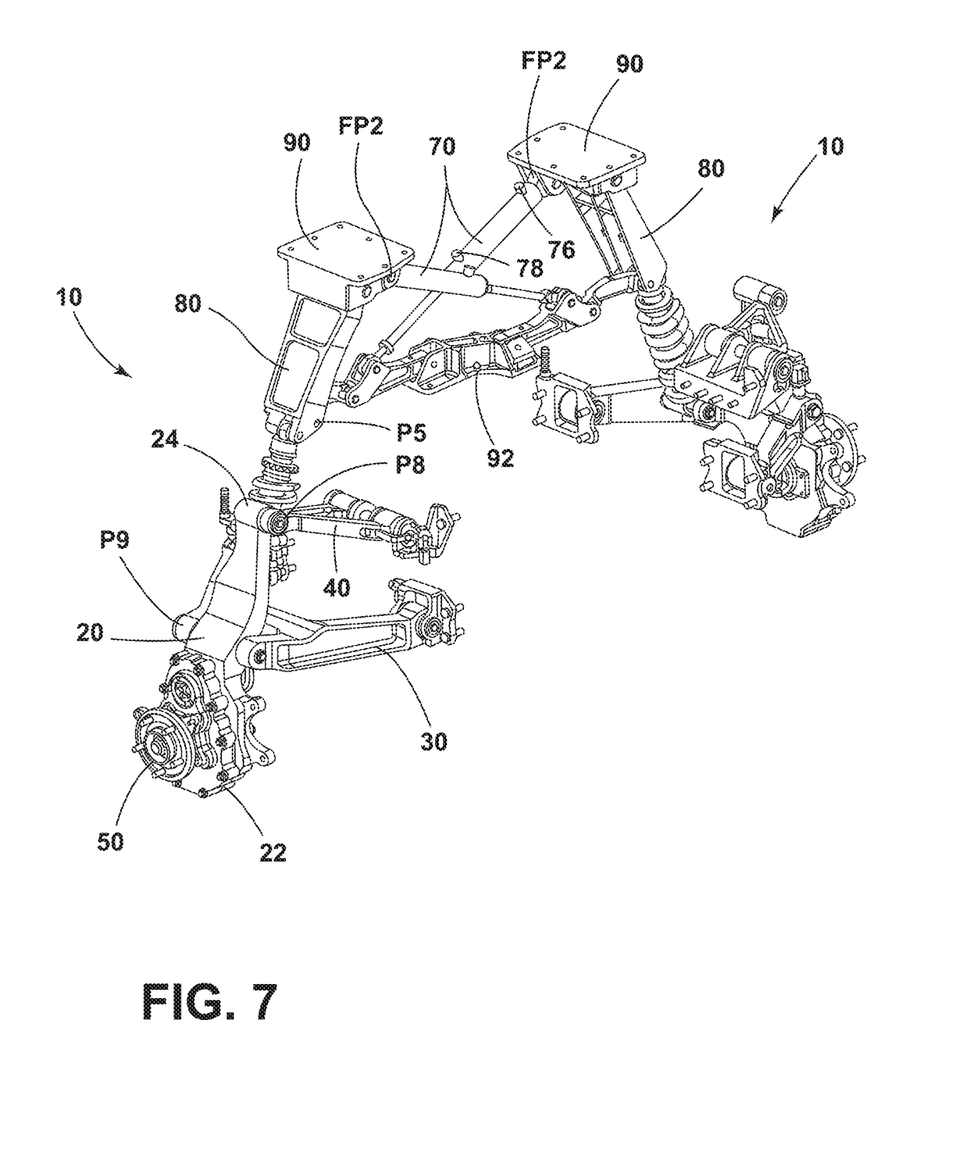
FIG. 7 is a schematic rear perspective view of port and starboard rear retractable wheel assemblies in a protracted position (certain components omitted for clarity)
Figure 8:
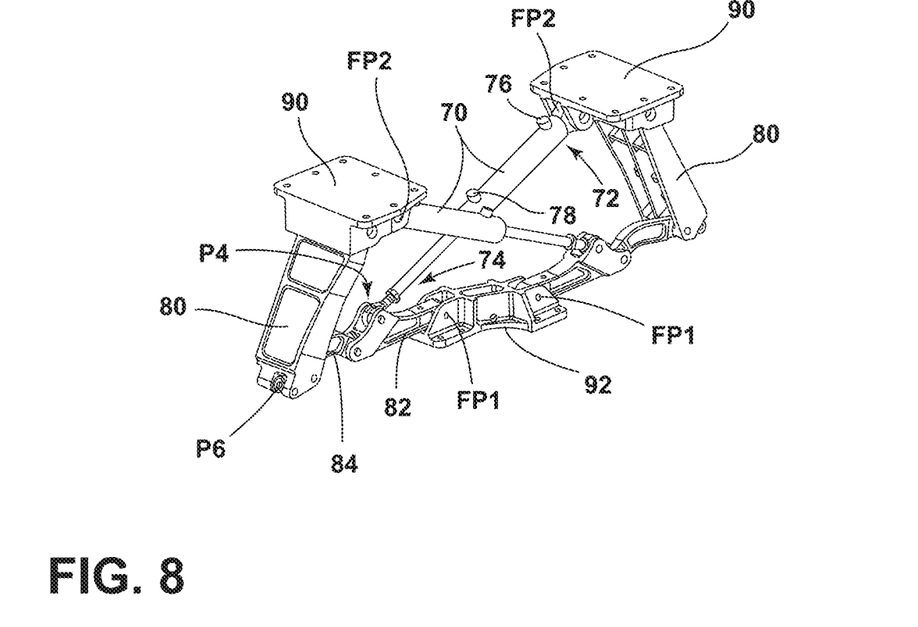
FIG. 8 is an enlarged detail view of a retraction linkage of the port and starboard rear retractable wheel assemblies of FIG. 7 (certain components omitted for clarity)
Figure 9:
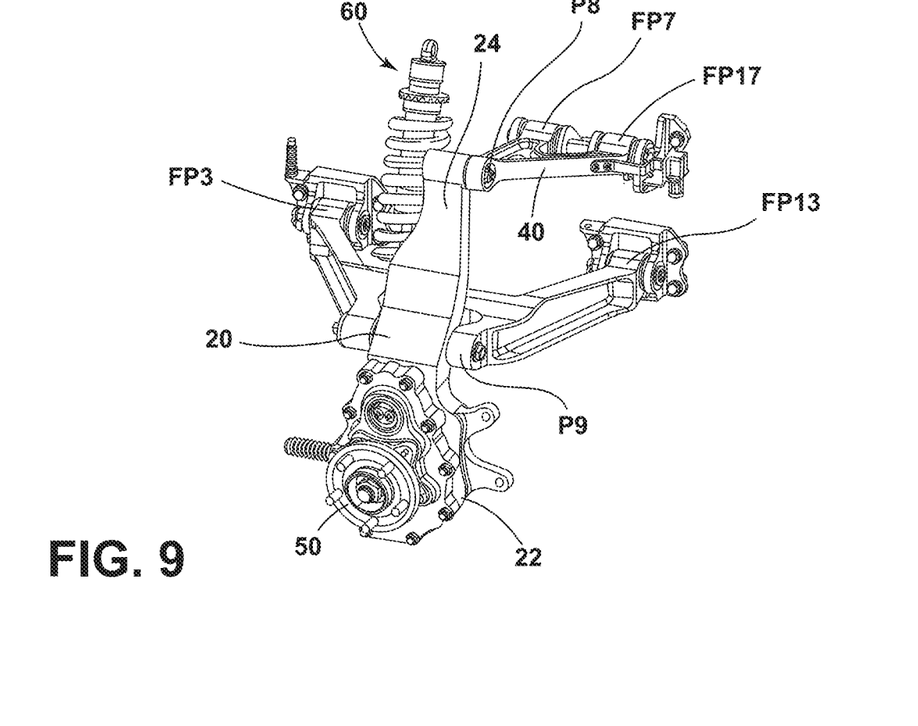
FIG. 9 is an enlarged detail view of a suspension assembly of the port rear retractable wheel assembly of FIG. 7 (certain components omitted for clarity)
Figure 10A:
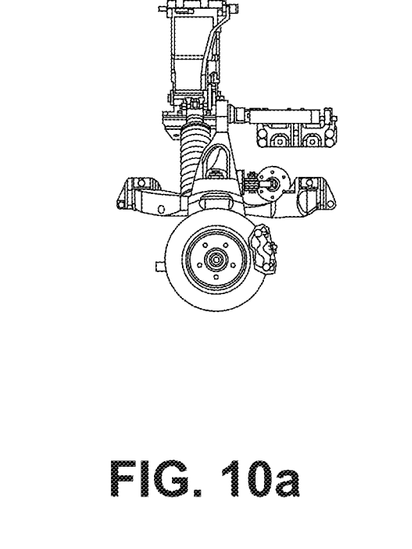
FIGS. 10a, 10b and 10c are schematic side, rear and rear perspective views respectively of the retractable wheel assembly of FIG. 1 in a protracted position (certain components omitted for clarity)
Figure 10B:
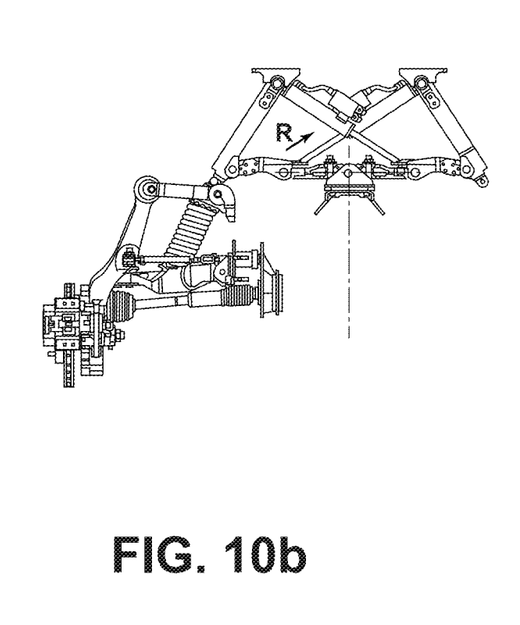
Figure 10C:
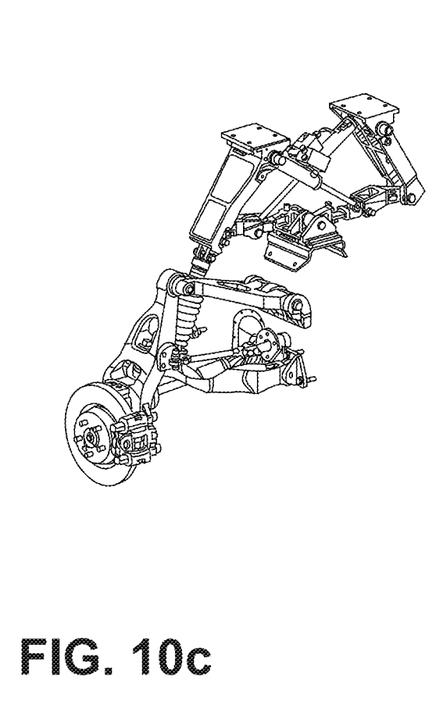
Figure 10D:
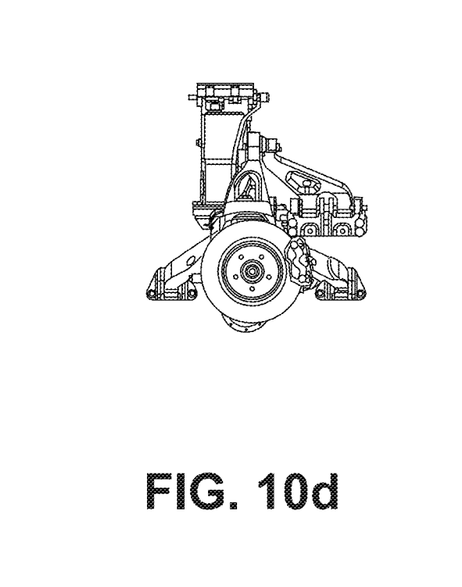
FIGS. 10d, 10e and 10f are schematic side, rear and rear perspective views respectively of the retractable wheel assembly of FIG. 1 in a partially protracted/retracted position (certain components omitted for clarity)
Figure 10E:
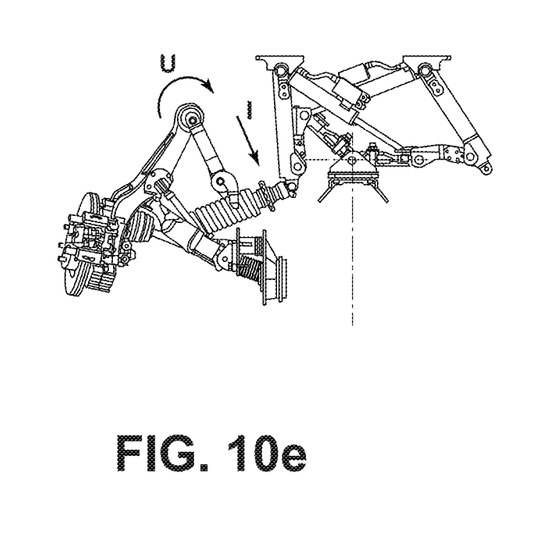
Figure 10F:
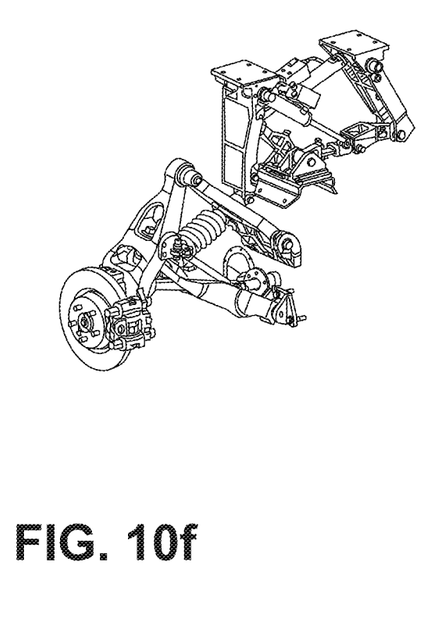
Figure 10G:
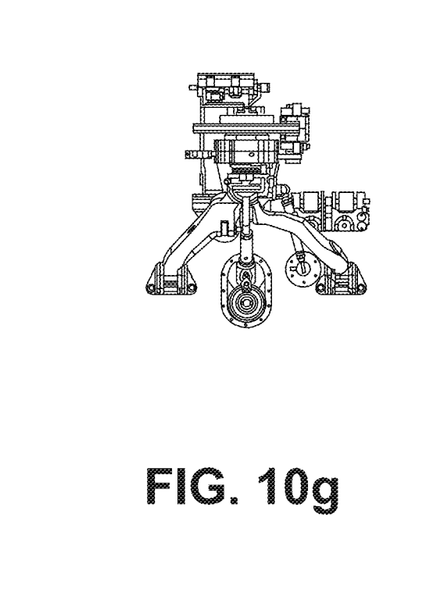
FIGS. 10g, 10h and 10i are schematic side, rear and rear perspective views respectively of the retractable wheel assembly of FIG. 1 in a retracted position (certain components omitted for clarity)
Figure 10H:
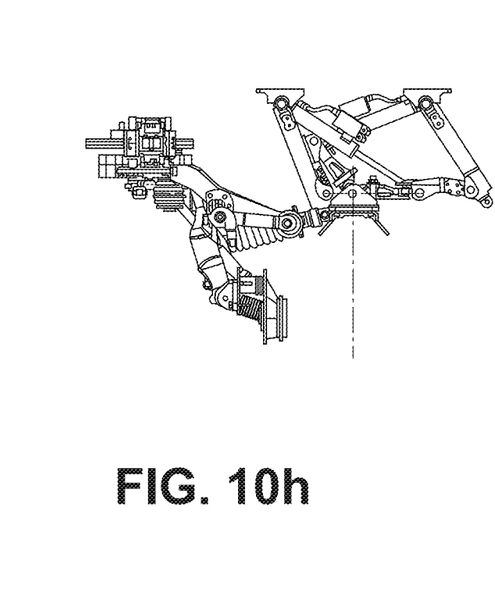
Figure 10I:
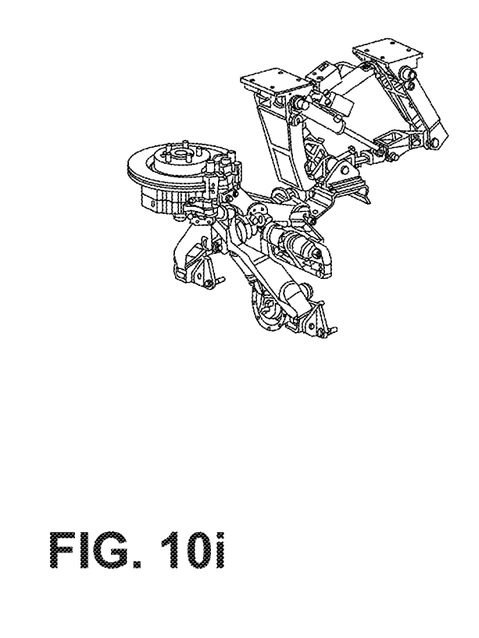
Figure 11A:
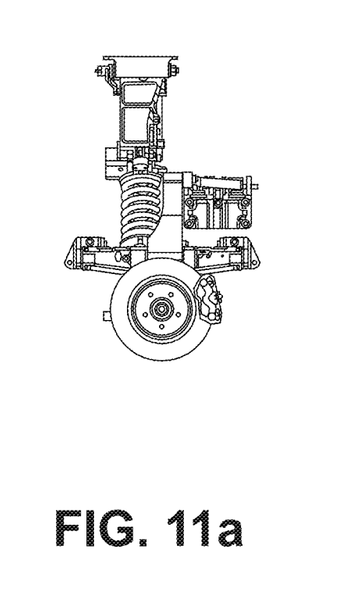
FIGS. 11a, 11b and 11c are schematic side, rear and rear perspective views respectively of the port rear retractable wheel assembly of FIG. 7 in a protracted position (certain components omitted for clarity)
Figure 11B:
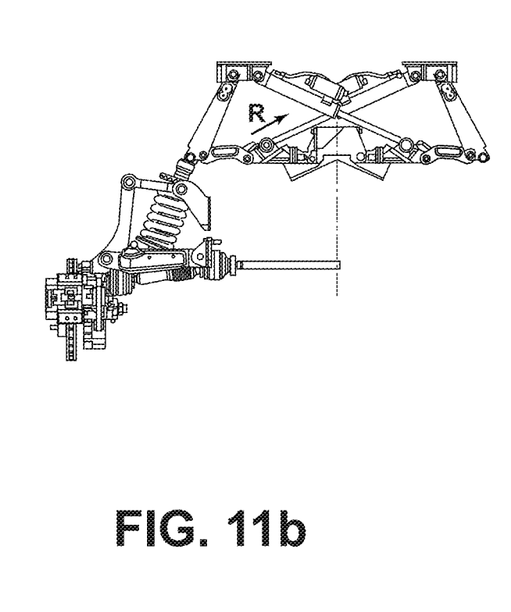
Figure 11C:
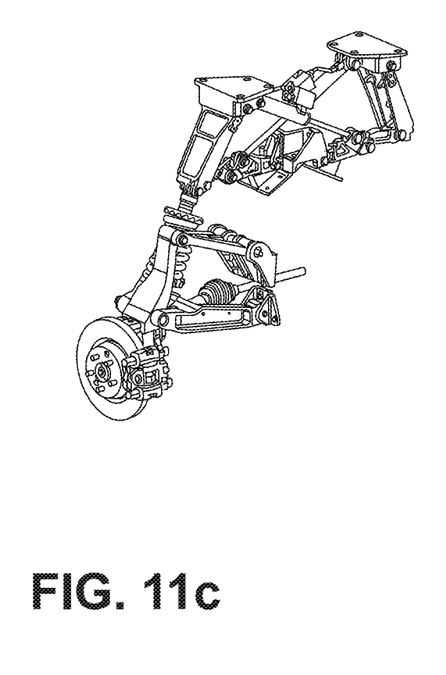
Figure 11D:
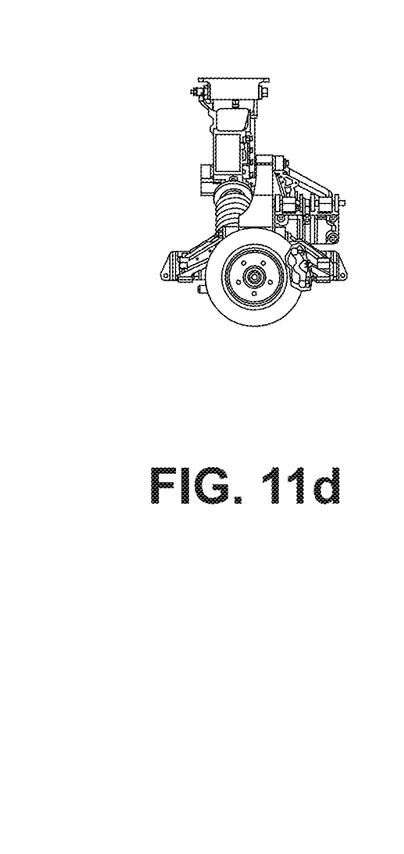
FIGS. 11d, 11e and 11f are schematic side, rear and rear perspective views respectively of the port rear retractable wheel assembly of FIG. 7 in a partially protracted/retracted position (certain components omitted for clarity)
Figure 11E:
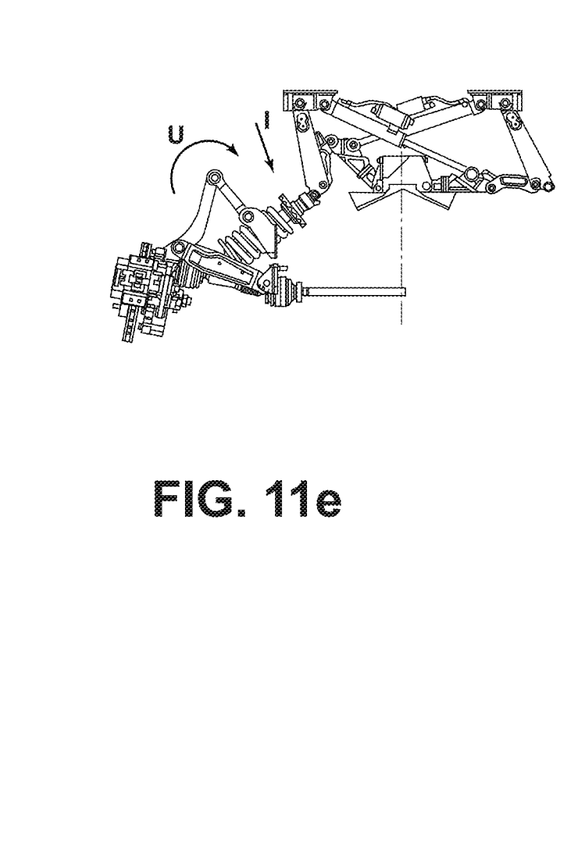
Figure 11F:
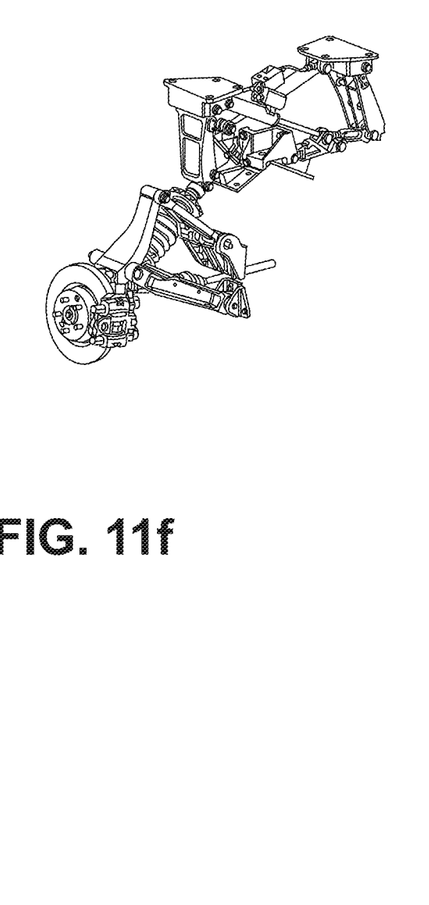
Figure 11G:
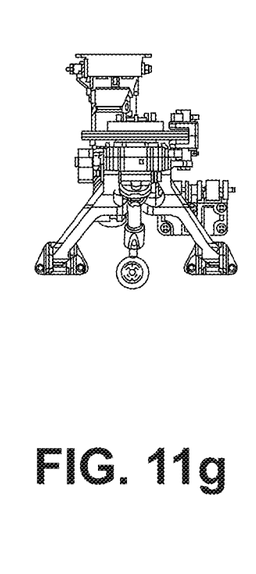
FIGS. 11g, 11h and 11i are schematic side, rear and rear perspective views respectively of the port rear retractable wheel assembly of FIG. 7 in a retracted position (certain components omitted for clarity)
Figure 11H:
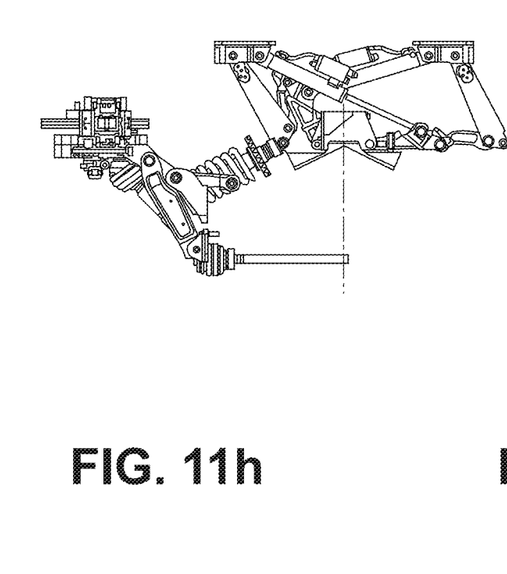
Figure 11I:
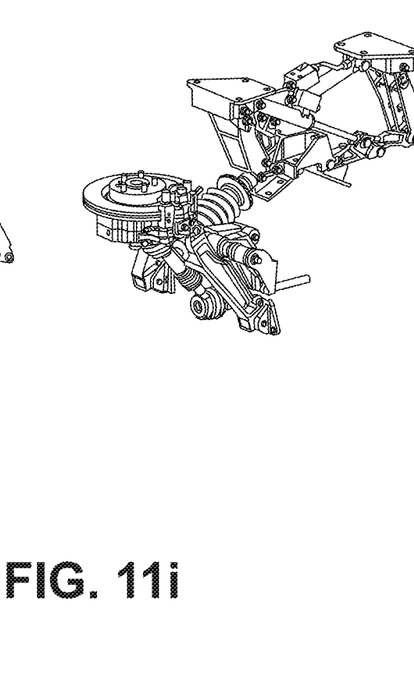
Figures 12, 13A, 13B, 13C:
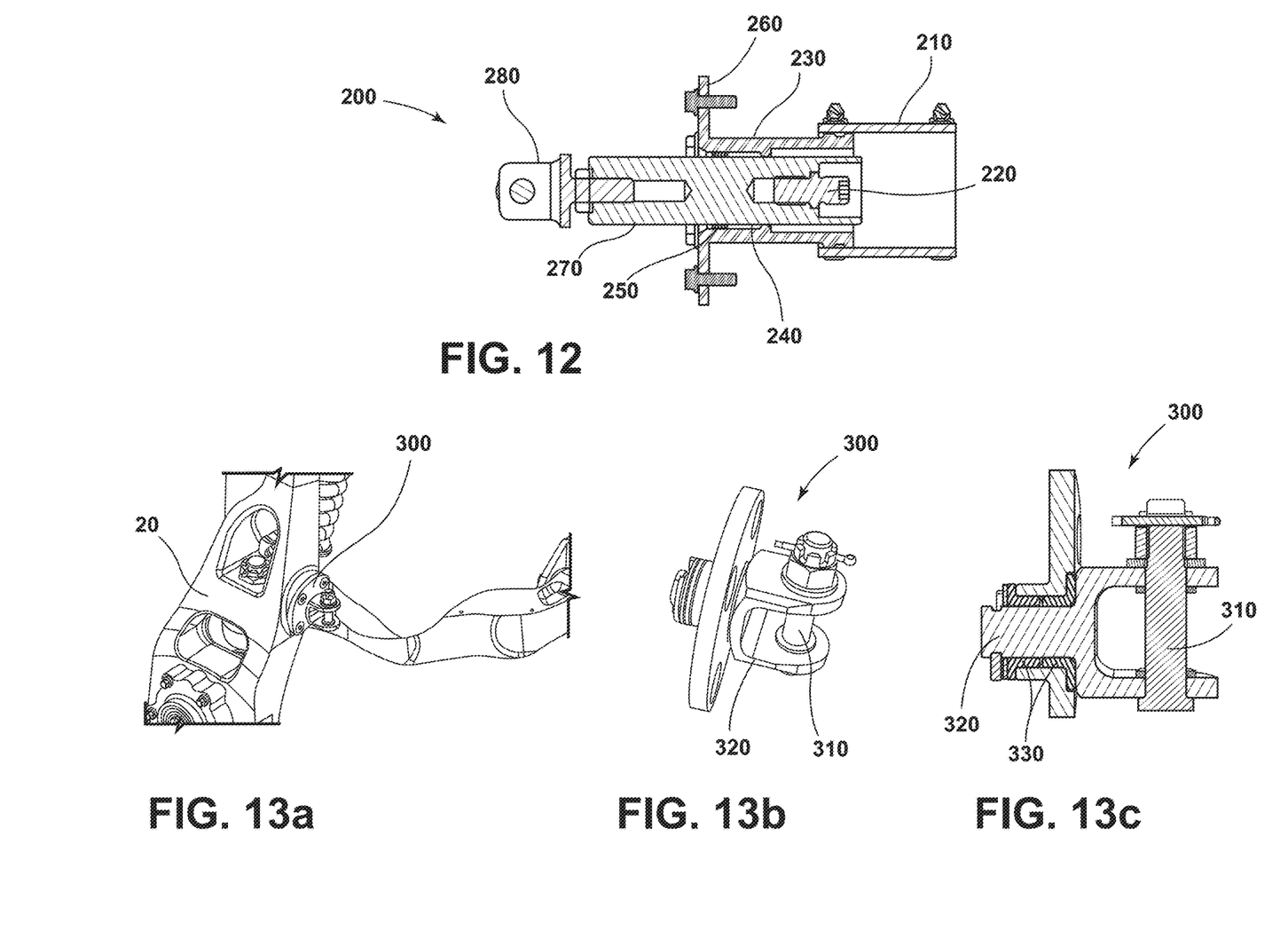
FIG. 12 is a schematic cross section view of a steering rack extension bar assembly for use with the retractable wheel assembly according to the present invention.
FIGS. 13a, 13b and 13c are a schematic perspective and cross section views of a rotatable steering joint assembly for use with the retractable wheel assembly according to the present invention.

FIG. 12 is a schematic cross section view of a steering rack extension bar assembly 200 for use with the retractable wheel assembly 10 according to the present invention. It provides for a modular extension (see item S in FIG. 3) to a steering rack which would otherwise, if itself extended, add additional loading and cause structural, geometric, packaging and sealing problems. The steering rack extension bar assembly 200 comprises a seal connection 210 to the steering rack, a threaded stud 220 for connecting to the steering rack, a seal and bearing housing 230, a linear bearing 240, a shaft seal 250, and O-ring seal 260 to seal against the hull of the amphibian, a steering rack extension bar 270, a tie rod 280 and ball joint clevis ASM (not shown).

FIGS. 13a, 13b and 13c are a schematic perspective and cross section views of a rotatable steering joint assembly 300 for use with the retractable wheel assembly 10 according to the present invention. The steering joint (see item J in FIG. 3) needs to provide for high degrees of articulation during retraction and a large steering angle when protracted. A ball joint (not shown) is attached via a pin 310 to a clevis 320 which can rotate in a set of bearings 330 in the suspension upright 20 (knuckle), providing for the high degree of articulation during retraction and the large steering angle when protracted.

Each feature disclosed in this specification (including the accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features. In addition, all of the features disclosed in this specification (including the accompanying claims, abstract and drawings), and/or all of the steps of any method or process so disclosed, may be combined in any combination, except combinations where at least some of such features and/or steps are mutually exclusive. Accordingly, while different embodiments of the present invention have been described above, any one or more or all of the features described, illustrated and/or claimed in the appended claims may be used in isolation or in various combinations in any embodiment. As such, any one or more feature may be removed, substituted and/or added to any of the feature combinations described, illustrated and/or claimed. For the avoidance of doubt, any one or more of the features of any embodiment may be combined and/or used separately in a different embodiment with any other feature or features from any of the embodiments.

Where reference in this specification is made to "above", "inboard", "port", "starboard", "centreline" and other like terms, these are to positions of an assembly, or a sub-assembly of, (or for use in) an amphibian when adopting its normal orientation, and these terms are to be construed accordingly (i.e. relative of/to one another in an assembly or sub-assembly, and not necessarily to a fixed point). It will be appreciated, for example, that an amphibian can adopt a nose-up attitude when planing on water, a nose-down attitude when braking on land, and various leaning, pitching, yawing, etc. positions when operating on land, off road or on water.

Whereas the present invention has been described in relation to what is presently considered to be the most practical and preferred embodiments, it is to be understood that the invention is not limited to the disclosed arrangements but rather is intended to cover various modifications and equivalent constructions included within the scope of the appended claims.

For example, hydraulic actuator 70 may take any suitable form of actuator, electric, pneumatic and/or hydraulic and/or any hybrid thereof. Similarly, the spring damper suspension strut 60 may take any suitable form, such as torsion bar and damper system, hydropneumatic units and/or gas or air springs and/or any hybrid thereof. Whilst wheels have been described throughout as the land propulsion means, track drives or individual track drives (i.e. to replace a single wheel) may be used as an alternative or in combination with wheels.

The invention claimed is:

1. A retractable wheel or track drive assembly for an amphibian, comprising:
    an actuator;

a retraction linkage assembly movable between a protracted position and a retracted position;
a suspension assembly at least partially connected to the retraction linkage assembly and movable between a protracted position and a retracted position; and
at least one wheel or track drive, wherein:
when the retraction linkage assembly and the suspension assembly are protracted then the retraction linkage or suspension assembly or both supports or holds the at least one wheel or track drive in a ground engaging position for use on land;
at least one component of the retraction linkage assembly is arranged so as to be spaced from the suspension assembly;
the actuator comprises a non-actuating end and an actuating end;
the suspension assembly comprises at least one of an upper control arm, a lower control arm and a suspension upright;
the non-actuating end of the actuator remains above at least a portion of any one of the upper control arm or the suspension upright in the protracted position and the retracted position of the retraction linkage assembly; and
at least one component or part or portion thereof that passes through a centre position to an overcentre position on protraction to prevent forces received in use via the at least one wheel or track drive from acting to retract the retractable wheel or track drive assembly.

2. The retractable wheel or track drive assembly as claimed in claim 1, wherein the retraction linkage assembly comprises the actuator.

3. The retractable wheel or track drive assembly as claimed in claim 1, wherein:
when the retraction linkage assembly and the suspension assembly are retracted then the retraction linkage assembly and suspension assembly or both supports or holds the at least one wheel or track drive in a non ground engaging position for use on water.

4. The retractable wheel or track drive assembly as claimed in claim 1, wherein the retraction linkage assembly comprises the at least one component or part or portion thereof.

5. The retractable wheel or track drive assembly as claimed in claim 1, wherein the suspension assembly comprises the at least one component or part or portion thereof.

6. The retractable wheel or track drive assembly as claimed in claim 1, wherein the at least one component or part or portion thereof includes at least two components or parts or portions thereof.

7. The retractable wheel or track drive assembly as claimed in claim 1, wherein the suspension assembly comprises a spring damper strut, a torsion bar and damper, a hydropneumatic unit, or a gas or air spring.

8. The retractable wheel or track drive assembly as claimed in claim 1, wherein the actuator comprises a hydraulic, electric or pneumatic actuator.

9. The retractable wheel or track drive assembly as claimed in claim 1, wherein the retraction linkage assembly comprises a retract arm, a lever and a cranked lever.

10. The retractable wheel or track drive assembly as claimed in claim 1, wherein the suspension assembly comprises an upper control arm, a lower control arm and a suspension upright.

11. The retractable wheel or track drive assembly as claimed in claim 10, wherein the upper control arm and lower control arm comprise wishbones.

12. The retractable wheel or track drive assembly as claimed in claim 1, further comprising:
a locking or holding device configured to lock or hold the retraction linkage in the one or more overcentre positions after protraction.

13. The retractable wheel or track drive assembly as claimed in claim 1, wherein the at least one wheel or track drive is retractable and protractable about an axis or axes each generally or substantially perpendicular to the axis of rotation of the wheel or track drive of the retractable wheel or track drive assembly.

14. A retractable wheel or track drive assembly for an amphibian, comprising:
an actuator;
a retraction linkage assembly movable between a protracted position and a retracted position;
a suspension assembly at least partially connected to the retraction linkage assembly and movable between a protracted position and a retracted position; and
at least one wheel or track drive, wherein:
when the retraction linkage assembly and the suspension assembly are protracted then the retraction linkage or suspension assembly or both supports or holds the at least one wheel or track drive in a ground engaging position for use on land;
the actuator comprises a non-actuating end and an actuating end;
the suspension assembly comprises at least one of an upper control arm, a lower control arm and a suspension upright;
the non-actuating end of the actuator remains above at least a portion of any one of the upper control arm or the suspension upright in the protracted position and the retracted position of the retraction linkage assembly; and
at least one component or part or portion thereof that passes through a centre position to an overcentre position on protraction to prevent forces received in use via the at least one wheel or track drive from acting to retract the retractable wheel or track drive assembly.

15. The retractable wheel or track drive assembly as claimed in claim 14, wherein:
both the non-actuating end and the actuating end of the actuator remain above at least a portion of any one or more of the upper control arm, the lower control arm or the suspension upright in the protracted and the retracted position of the retraction linkage assembly.

16. The retractable wheel or track drive assembly as claimed in claim 14, wherein:
at least one of the non-actuating end and the actuating end of the actuator remains inboard of at least a portion of any one or more of the upper control arm, the lower control arm or the suspension upright in the protracted position of the retraction linkage assembly.

* * * * *

UNITED STATES PATENT AND TRADEMARK OFFICE
CERTIFICATE OF CORRECTION

PATENT NO. : 11,766,908 B2
APPLICATION NO. : 16/936010
DATED : September 26, 2023
INVENTOR(S) : Alan Timothy Gibbs It is certified that error appears in the above-identified patent and that said Letters Patent is hereby corrected as shown below:

In the Specification

Column 1, Line 50:
"The" should be — There —

Column 3, Line 28:
Delete "a"

Column 4, Line 19:
Delete "a"

Column 5, Line 21:
Delete "FP13" (duplication)

Column 5, Line 22:
"another" should be — one another —

Column 5, Line 59:
"retract" should be — retraction —

Column 6, Line 31 (2nd occurrence):
"OCP" should be — OCS —

Column 7, Line 1:
"retract" (2x) should be — retraction —

Column 8, Line 28:
"feature" should be — features —

Signed and Sealed this
First Day of October, 2024

*Katherine Kelly Vidal*
*Director of the United States Patent and Trademark Office*

CERTIFICATE OF CORRECTION (continued)
U.S. Pat. No. 11,766,908 B2

In the Claims

Column 9, Claim 1, Line 9:
"assembly or both" should be — assembly, or both, —

Column 9, Claim 3, Line 38:
"assembly or both" should be — assembly, or both, —

Column 9, Claim 3, Lines 39-40:
"non ground engaging" should be — non-ground-engaging —

Column 9, Claim 9, Line 60:
"retract" should be — retraction —

Column 10, Claim 14, Line 30:
"assembly or both" should be — assembly, or both, —